Sept. 10, 1946.  F. L. FOLIS  2,407,411
MENU SELECTOR AND RECORDER
Filed May 25, 1944  4 Sheets-Sheet 1
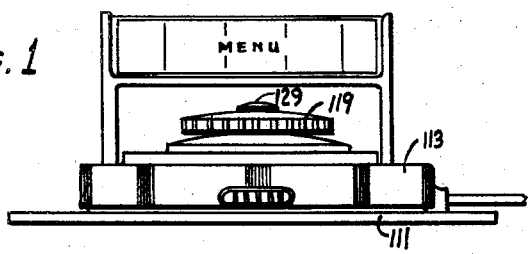
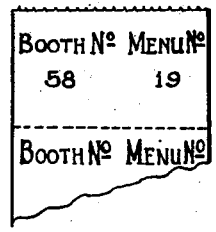
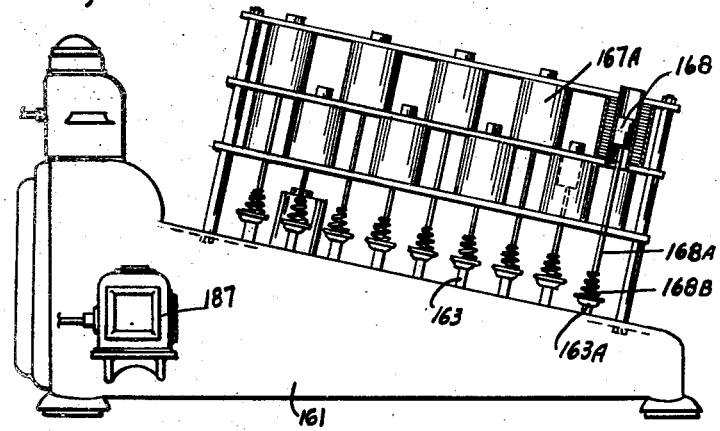
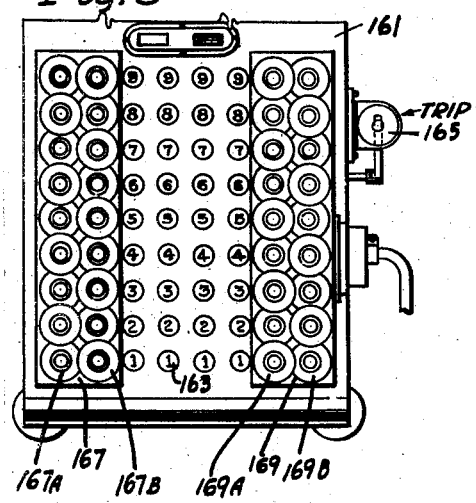
INVENTOR.
FRANK L. FOLIS
BY

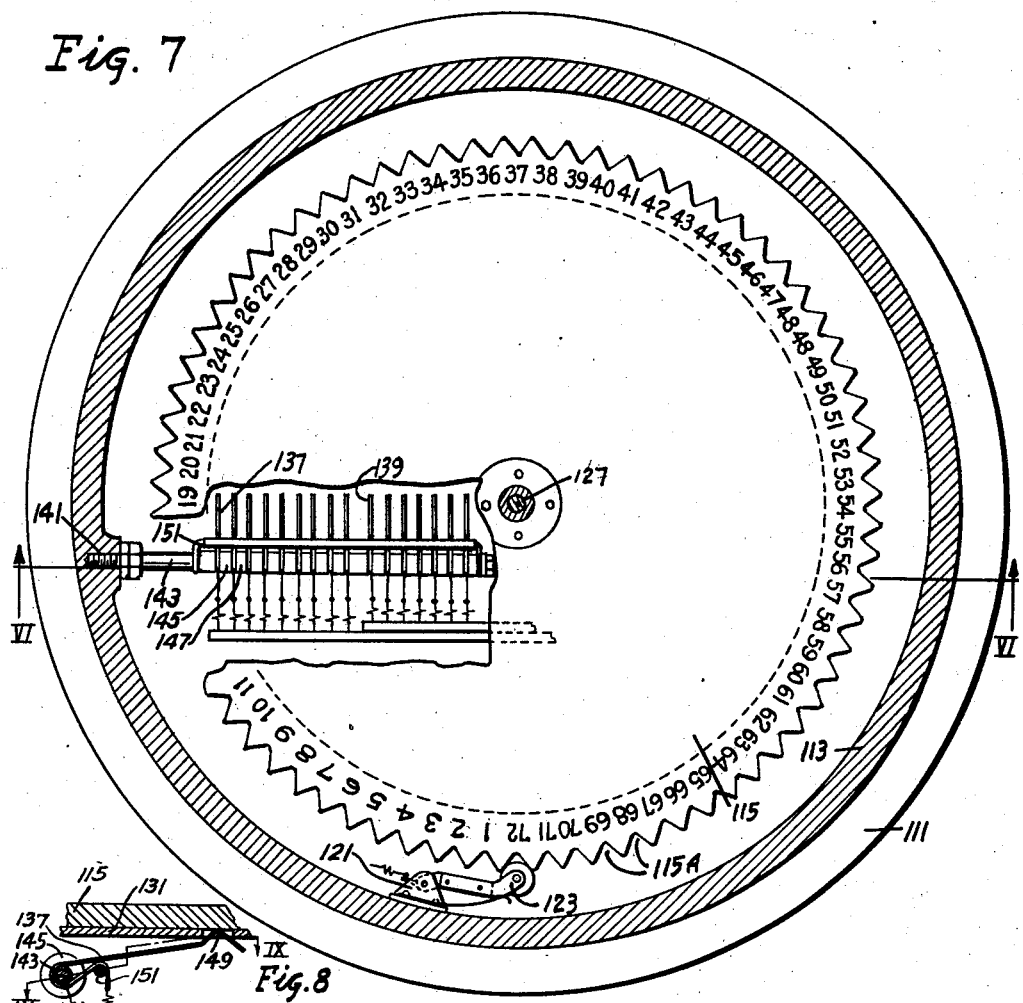
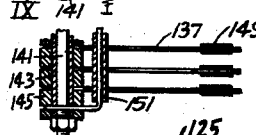
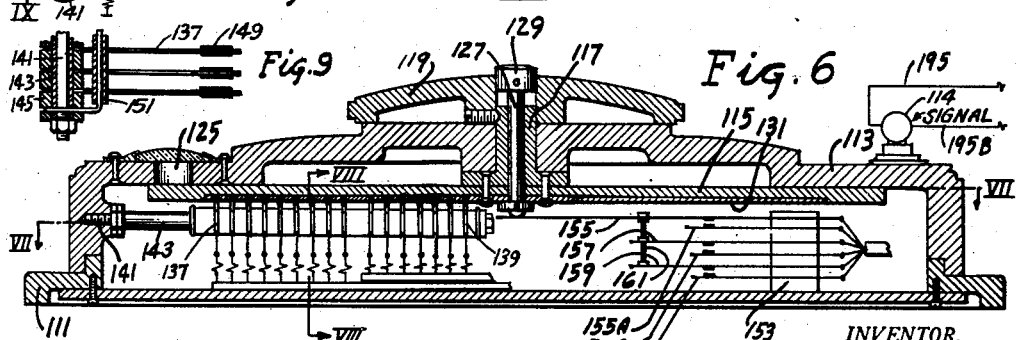

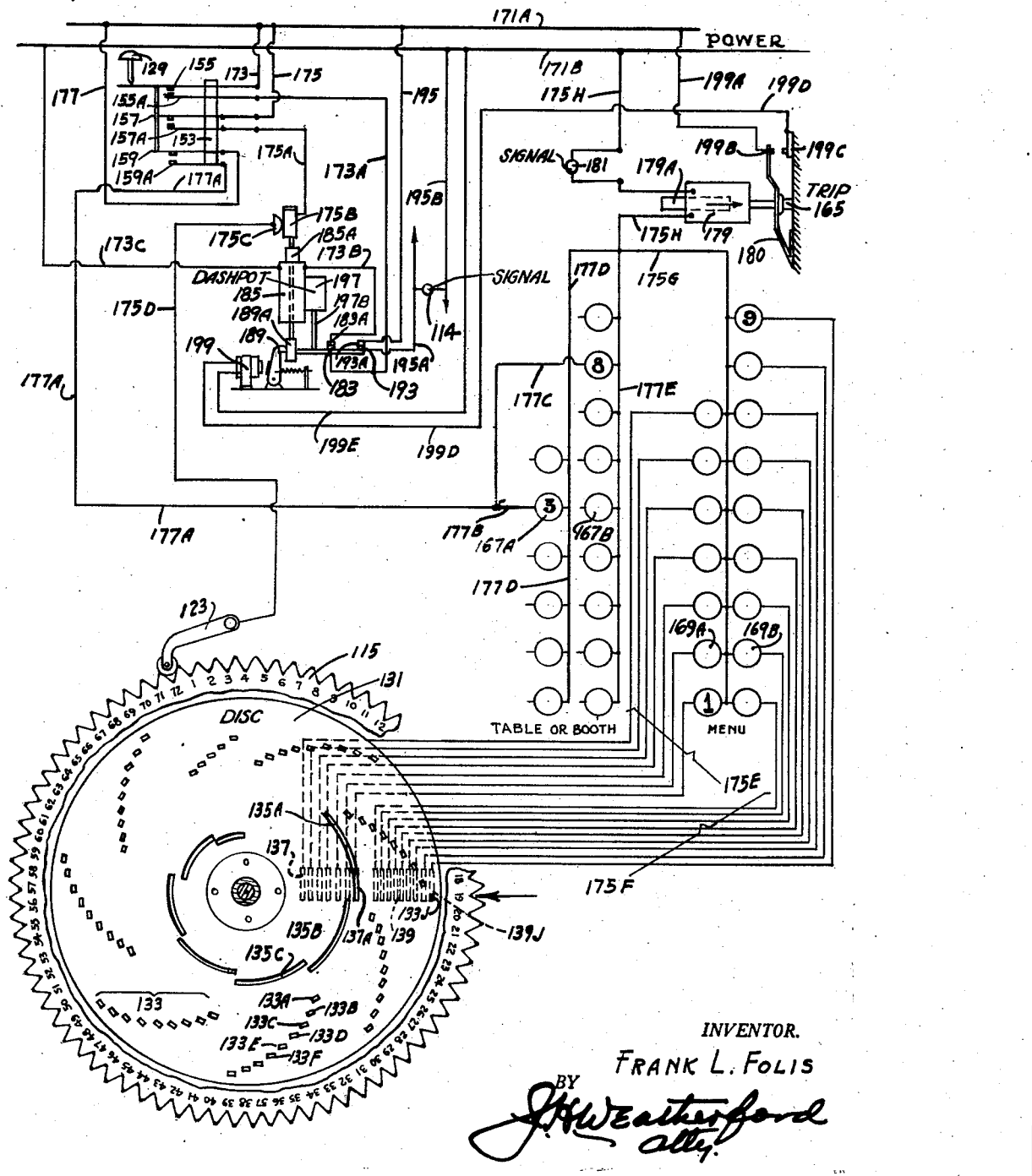

Patented Sept. 10, 1946

2,407,411

UNITED STATES PATENT OFFICE 2,407,411

MENU SELECTOR AND RECORDER

Frank L. Folis, Memphis, Tenn.

Application May 25, 1944, Serial No. 537,341

4 Claims. (Cl. 177—339)

This invention relates to mechanisms for cafes, restaurants, or the like, through which the customers or patrons may indicate on a recording mechanism, in the serving room or kitchen where the order is to be filled, the choice or choices which they have made from a menu, and the table at which the order was given and to which it is to be delivered.

At the present time in cafes and the like, the patron gives his order to a waiter who, mentally or in writing, makes a note of the order and turns the same in orally, or otherwise, to the kitchen or serving room where the order is filled for subsequent delivery to the customer. The order is often incorrectly noted by the waiter, or perhaps incorrectly given by the customer, in either event causing dissatisfaction and dispute, but whether this be true or not, much time of the waiter is consumed while the customer makes his selection, and in many cases dawdles over the order.

The present invention contemplates the selection and indication by the patrons at the various tables or stations of the orders which they wish to place and the recording of these orders on suitable printing mechanisms in the serving room or kitchen where the order is to be filled.

In carrying this out, selector mechanisms are provided, one for each of the tables respectively, at which the orders are to originate. These selectors are connected by individual electric circuits to a recording and printing mechanism in the serving room. Each of the selectors carries a number identifying the station at which it is placed, and at each use of the selector this number is recorded on the printing mechanism. The patron operates the selector to set up therein the number of the item on the menu card which he desires, and having set up his selection completes the giving of the order by closing the electric circuits to the recording mechanism which prints the number of the order given and the number of the station from which the order was sent, the order being subsequently filled from the printed memorandum thus made and the delivery of the order to the table manually effected.

The objects of the invention are:

To provide means through which the patron at a table may select and indicate at a remote point the order which he desires filled, and mechanism at such remote point which will print the selection made and the station at which such selection originated and to which it is to be delivered;

To provide suitable mechanisms for the tables on which the selections made may be set up for individual transmission; and To provide suitable mechanism through which operation of a tabulating and printing mechanism, preferably of well known type, may be effected by remote control from such stations.

The means by which these objects are accomplished, and the manner of their accomplishment, will readily be understood from the following specification upon reference to the accompanying drawings, in which:

Fig. 1 is a front elevation of the selector mechanism.

Fig. 2 is a side elevation of a typical form of tabulating mechanism having banks of keys which may be individually depressed to set up desired numbers, and be subsequently actuated in usual manner to print on a tape the numbers so set up and release the keys, and showing in connection therewith key-depressing devices through which the depression of the keys of the tabulator is accomplished.

Fig. 3 is a plan of the key-board of the recording mechanism, or tabulator, with the depressing mechanisms in place, the tabulator shown having eight banks of keys, four banks only of which are used in the present mechanism.

Fig. 4 is a fragmentary section of a paper tape on which the tabulating mechanism has printed a selected menu number and the booth or table number from which the order was sent in, the tape showing a single order of menu item 19 from table or booth 58.

Fig. 5 is a fragmentary portion of a menu card showing items on the menu, and their numbers, for order purposes, and the price of the item corresponding.

Fig. 6 is a sectional elevation taken on the center line of the selector mechanism, being the line VI—VI of Fig. 7; and Fig. 7 a sectional plan taken on the line VII—VII of Fig. 6.

Fig. 8 is an enlarged fragmentary sectional elevation taken on the line VIII—VIII of Fig. 6, and showing selector fingers set up.

Figure 11:
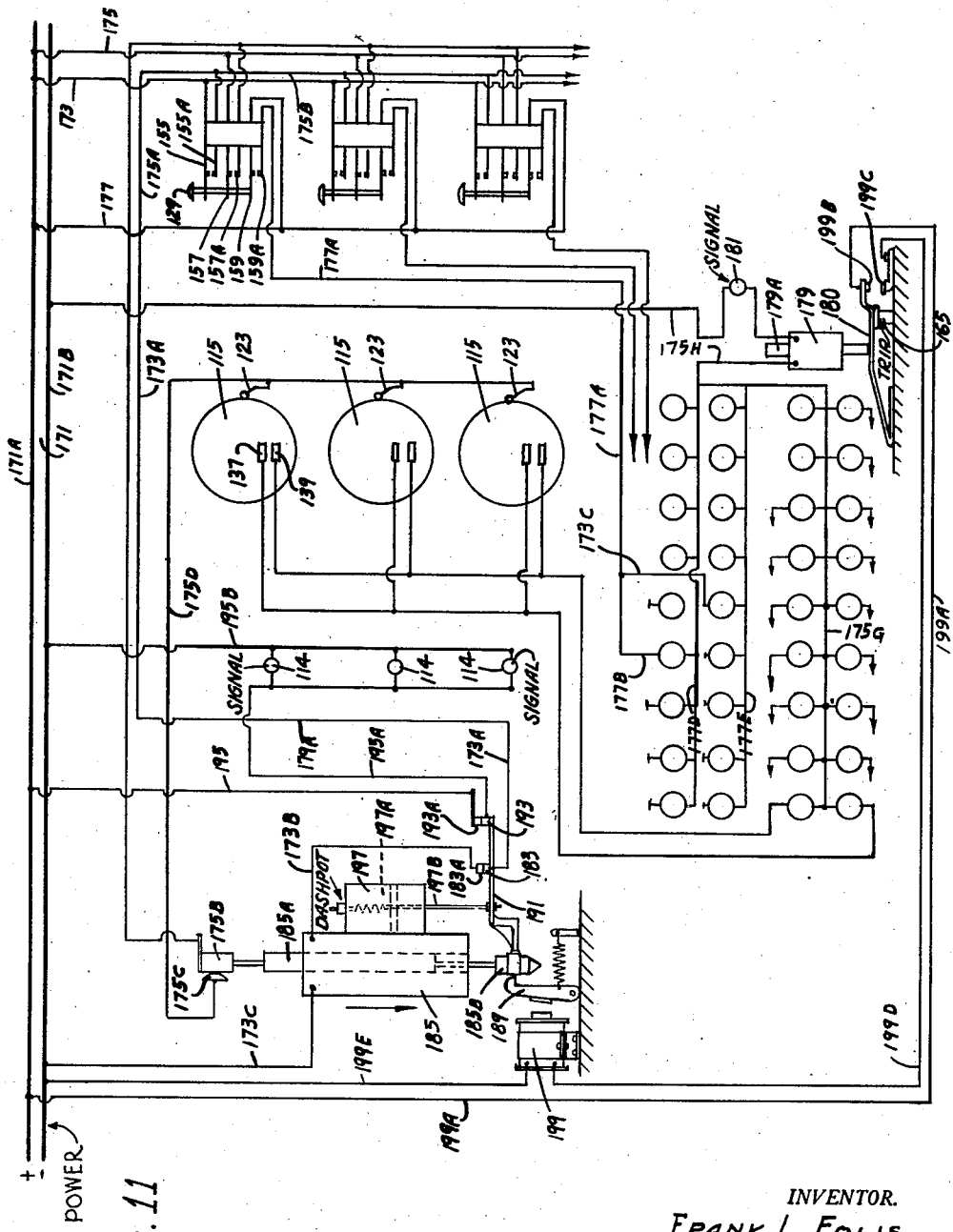

Fig. 9 a corresponding enlarged fragmentary plan of the selector finger set up, taken on the line IX—IX of Fig. 8.

Fig. 10 is a view showing in plan a major part of the rim of a selector dial, the remainder of the dial being broken away to show the selector disc in plan, and the underlying fingers, the view also showing diagrammatically the circuits from the dial and the fingers to the tabulating and recording mechanism, the dial selected for illustration being that for table number 58 and the item selected from the menu being number 19.

Fig. 11 is a similar diagrammatic view showing a plurality of the operating circuits, discs for these tables being shown.

Referring now to the drawings in which the various parts are indicated by numerals:

The selector includes a base 111 of circular form, having a cover 113, also circular in form, which cooperates with the base to establish a casing in which the mechanism of the selector is housed, the casing being preferably of dielectric material. 114 is a signal light.

The mechanism comprises a selector dial 115 which is concentric with and rigidly secured to a quill shaft 117 journalled in the cover 113 of the casing, the upper end of the shaft being suitably secured to a knob 119 which may be manually turned and which when turned correspondingly turns the dial, the knob 119 resting on the top of the cover 113 and supporting the dial.

The edge of the dial is provided with notches 115A which are numbered consecutively from 1 upward, in the present instance there being seventy-two of these notches consecutively numbered to such number.

The casing carries a bracket 121 in which is mounted a spring-pressed detent 123 which successively engages the notches and holds the dial from time to time during shift. The casing cover is provided with a suitable hole or opening 125 through which the numbers on the dial are successively visible, in the present illustrations, the number 19 being in register with this opening, indicating that item 19 on the menu card has been selected.

Disposed through the knob 119 and the quill shaft 117 is a depressible plunger 127, preferably having a button 129 on its upper end, which button and plunger may be depressed after proper selection has been made to actuate certain electrical circuits, hereinafter to be described.

The dial 115 and the quill shaft 117 are of metal, the plunger 127 preferably being of dielectric material. Underlying the dial and rigidly secured thereto is a disc 131 of dielectric material, this disc having holes 133A, 133B, 133C, etc., in groups of nine therethrough, all of the holes 133A lying in a path concentric with the center of the disc and the holes 133B, 133C, etc., being arranged in similar paths. Each respectively of the holes designated by the letters A also lies on a radial line through a unit digit 1, and of the B, C, etc., respectively of the numbers designating the notches on the dial.

The disc is additionally provided with slots 135A, 135B, etc., which are also concentric with the disc, these slots respectively embracing arcuate sectors corresponding with the tens of the dial numbers, and respectively embracing the numbers 10 through 19; 20 through 29, etc., there being seven of these concentric slots corresponding to the groups of numbers from 10 to 70 inclusive.

Underlying the disc 131 are two groups of contact or sensing fingers 137, 139, the fingers of the group 137 respectively underlying the concentric paths of the unit holes 133A, 133B, etc., respectively, and the fingers 139 similarly underlying respectively the concentric slots 135.

The fingers 137, 139 are preferably carried by a horizontal bolt 141, around which is a sleeve 143 of dielectric material, the fingers being spaced along the sleeve and insulated the one from the others by dielectric collars 145, 147. The fingers are resilient and have upwardly projecting contact points 149 adapted to pass through the holes, or slots, as the case may be, into contact with the overlying dial 115, and being urged toward such contact as by a support 151.

Also disposed in the casing is a post 153 of dielectric material, which carries three resilient metal tongues 155, 157 and 159, the upper of these tongues 155 extending into underlying relation with the plunger 127, being depressible thereby, and preferably resiliently supporting the plunger and restoring it to initial position after such depression. The outer ends of the tongues 157 and 159 are connected to the tongue 155 by a spacing member 161 of dielectric material for concurrent depression when the arm 155 is depressed. The post 153 also carries an additional set of tongues 155A, 157A and 159A respectively underlying the tongues 155, 157 and 159, both sets of tongues carrying contact points for effecting circuit closures, the tongues 155, 155A establishing when closed a first circuit, hereinafter called a control circuit, the tongues 157, 157A, a second or menu circuit and the tongues 159, 159A a third or table circuit.

The recording or tabulating mechanism comprises a well known type of tabulating machine having keys which are depressible and an electrically actuatable mechanism for operating the tabulator to print on a tape, numbers set up by the depression of the keys.

In Figs. 2 and 3, 161 is the casing of a machine having keys 163 in banks of 1 to 9, which are depresible to set up the numbers to be printed, the machine shown having eight such banks, of which four only are used. The mechanism also has a trip device 165 which may be electrically operated, to cause the numbers set up by key depression, to be printed and to release the keys, such mechanisms being of well known type and in general use.

Mounted on the tabulator 161 are frames 167 and 169 which respectively carry groups of solenoids which overlie banks of keys of the tabulator. In the present instance the frame 167 carries two groups of the solenoids 167A, 167B, respectively overlying banks of the keys of the tabulator in ten and unit relation, and the frame 169 likewise two groups 169A, 169B, in similar relation with an additional two banks of keys. Each of the solenoids respectively has its plunger, as the plunger 168, connected through a rod 168A and compression spring 168B into depressing contact with a key, as the key 163A.

Each selector mechanism is connected to the recording mechanism by three electric circuits, herein designated respectively as the control circuit, the menu circuit, and the table circuit, which are energized from a suitable source of power, as a power line 171A, 171B, a typical set of these circuits, for table 58 as typical, being diagrammatically shown in Fig. 10, and the set up for a number of tables in Fig. 11. From one lead 171A of the power line, leads 173, 175 and 177 extend respectively to the tongues 155, 157 of the menu, and 159 of the table circuits.

To set up the menu circuit, a lead 175A is extended from the tongue 157A through complementary contacts 175B, 175C, and lead 175D, to and through detent 123 to a contact with the metal dial 115.

Underlying the dial and the disc 131 the fingers 137, for the most part insulated from such dial by the disc, are respectively connected through leads 175E to the solenoids 169A which overlie the tens bank of keys, and the fingers 139 through leads 175F to the solenoids 169B, which overlie the related unit bank of keys. All of the solenoids 169A, 169B are connected through joint return leads 175G, 175H to the other lead 171B of the power line.

The return lead 175H is in circuit through a solenoid 179 which has its plunger 179A in abutting relation with a resilient arm 180 biased toward such plunger and overlying the trip device 165 of the tabulator, the solenoid being energized to depress the arm and operate the trip when the circuit just above described is completed. A signal light 181 in circuit with the return lead 175H may be provided if desired.

To set up the table circuit, a lead 177A is extended from the tongue 159A and through branch leads 177B and 177C to the solenoids 167A, 167B over the five and eight keys of ten and unit related banks respectively of the tabulator, the circuit being respectively completed through the return leads 177D and 177E to the return lead 175H, and thence to the power line.

To set up the control circuit, which is a joint circuit for all the tables, the lead 173 is continued by a lead 173A from the tongue 155A to a contact 183, and continues from a complementary contact 183A through a lead 173B to a solenoid 185, from which a return lead 173C establishes the return circuit to the power line lead 171B. Solenoid 185 and related parts are preferably mounted in a casing 187 disposed in adjacency to or mounted as shown on the side of the tabulator 161.

The plunger 185A of the solenoid carries on its upper end the contact 175B of the menu circuits, breaking these circuits when the solenoid is energized, and on its lower end a latch member 185B, with which a latch 189 engages when energization occurs, the latch holding the plunger depressed until released. Latch member 185B carries a laterally extending arm 191 on which the contact 183 is mounted. Arm 191 also carries an additional contact 193 which cooperates with a complementary contact 193A to make and break a joint circuit to the signal lights 114, this circuit comprising a lead 195 from the power line to the contact 193A, a lead 195A from the contact 193 to the lights 114, and a return lead 195B to the power line. Mounted along the side of the solenoid 185 is a dash-pot 197, having a piston 197A, and piston rod 197B which is secured at its lower end to the arm 191 and delays the rate of movement of the solenoid plunger 185A.

Adjacent the latch 189 is an electro-magnet 199 which cooperates with the latch to release the solenoid plunger 185A. Magnet 199 is energized by a circuit, including leads 199A from the power line to a contact 199B, carried by an extension of the arm 180 beyond the tabulator trip 165, a complementary contact 199C, a lead 199D therefrom to the magnet, and a return lead 199E from the magnet to the power line, the arm 180 normally holding the contact 199B away from the contact 199C and interrupting the circuit.

To set up the system, the tabulator is equipped with the key-depressing mechanisms, one for selecting table numbers and the other for selecting menu numbers. Selectors are disposed one at each of the tables or stations at which orders are to originate, and electrical circuits from these selectors are set up to the key-depressing mechanisms and the tabulator operating mechanism.

When set up and the current is turned on, the lights 114 on the various selectors at the tables are all burning. The patron at any table, as the table 58, selected and used hereinbefore for illustration, determines from the menu the number of the selection on the menu which he desires to order and turns the dial of his selector until the selected number shows up beneath the window 125 in the casing of the selector, the detent 123 centering the number in correct position and holding the dial against accidental displacement during subsequent operations. So turned, to the number 19, used throughout as an example, the arcuate slot 135A in the disc 131 is positioned over the finger 137A, permitting that finger to contact the dial 115, and the hole 133J in the disc is positioned over the finger 139J, allowing that finger also to contact the dial.

After the dial is positioned, the patron depresses the button 129 closing the circuits through the tongues 159, 159A; 157, 157A; and 155, 155A respectively, and actuating the various mechanisms controlled by these circuits. Closure of the circuit through the tongues 159, 159A completes from the table, in the selected instance, table 58, with the leads 177, 177A, the parallel leads 175B, 175C, and the return leads 177D, 177H, parallel circuits to the solenoids respectively overlying the 5 key and the 8 key of the related ten and unit banks of keys of the tabulator, depressing these keys and setting up the number 58 for printing on the tape.

Concurrently, contact of the tongues 157, 157A completes a lead, including leads 175, 175A, contacts 175B, 175C, leads 175 and the detent 123 to the dial 115, and through the dial and fingers 137A and 139J completes parallel leads through related ones of the leads 175E and 175F to the solenoids overlying the unit numbers 1 and 9 keys of the second related tens and unit banks of keys on the tabulator, the circuits being completed through joint return leads 175G and 175H, and causing actuation of the solenoids to depress the keys 1 and 9 and set up in the tabulator the number 19 for printing.

The return leads 175H of these circuits passes through the solenoid 179 over the depressor key 165 of the tabulator printing and reset mechanism, concurrently energizing the solenoid and depressing the key. This action, however, is delayed by the resistance of the resilient arm 180 sufficiently to allow the substantially instantaneous actuation of the tabulator keys before action of the printing mechanism and trip.

Concurrently with closure of the just described circuits through the tongues 157, 157A; 159, 159A, circuit is completed through the tongues 155, 155A and the contacts carried thereby from the power line through the leads 173, 173A, the contacts 183, 183A, the leads 173B and the return lead 173C to energize the solenoid 185 and depress the plunger 185A, and the latching member 189A thereof, into latching engagement with the latch 189, and also breaking the circuit through the contacts 175B, 175C, and separating the contacts 183, 183A; and 193, 193A; respectively breaking the circuit to the solenoid 185, and the circuit 195, 195A, 195B through the lights 114 and causing these lights to go out, indicating to all the tables that selection is at that instant being made at one of the tables.

As the tabulator solenoid 179 completes its action the contacts 199B and 199C are closed completing the release circuit through leads 199A, 199D to the magnet 199 and from this magnet through the lead 199E, retracting the latch 189 and releasing the latch mechanism 185B, completing the operations.

I claim:

1. In apparatus of the character described, a tabulating mechanism having depressible keys in banks, and electrically actuated printing and clearing mechanisms, including a depressible key for initiating actuation thereof; two groups of solenoids respectively disposed in operative relation above keys of adjacent said banks, and an additional solenoid overlying said actuating mechanism key; and control and energizing means including a source of electric current; actuators positioned respectively at each of a plurality of stations, each said actuator including a circuit selector, open circuits energizable by said source extending respectively each from a said actuator to said tabulator, a first of said circuit including open leads extending in parallel from said actuator each respectively to a solenoid of one said group; a second said circuit including a plurality of leads insulated from said selector and extending therefrom each respectively to a solenoid of the second said groups, all said circuits including a joint return lead through said additional solenoid to said current source, said actuators each respectively including means manually operable to shift said selector into electrical contact with desired leads of said second group, and manually operable means for closing all said circuits leading therefrom.

2. In apparatus of the character described, a tabulating mechanism having depressible keys in banks, and electrically actuated printing and clearing mechanisms, including a depressible key for initiating actuation thereof; two groups of solenoids respectively disposed in operative relation above keys of adjacent said banks, an additional solenoid overlying said actuating mechanism key, and an action delaying arm interposed between said latter solenoid and key; and control and energizing means including a source of electric current; actuators positioned respectively at each of a plurality of stations, each said actuator including a circuit selector, open circuits energizable by said source extending respectively each from a said actuator to said tabulator, a first of said circuits including open leads extending in parallel from said actuator each respectively to a solenoid of one said group; a second said circuit including a plurality of leads insulated from said selector and extending therefrom each respectively to a solenoid of the second said group, all said circuits including a joint return lead through said additional solenoid to said current source, said actuators, each respectively, including means manually operable to shift its said selector into electrical contact with desired leads of said second group, and manually operable means for closing all said circuits.

3. In apparatus of the character described, a tabulating mechanism having depressible keys in banks, and electrically actuated printing and clearing mechanisms including a depressible key for initiating actuation thereof; two groups of solenoids respectively disposed in operative relation above keys of adjacent said banks, an additional solenoid overlying said actuating mechanism key, and an action delaying arm overlying said latter key; and signal means; and control and energizing means including a source of electric current, actuators positioned respectively at each of a plurality of stations, each said actuator including a circuit selector, open circuits energizable by said source extending respectively each from a said actuator to said tabulator, a first of said circuit including a pair of leads extending in parallel from said actuator to a pair of solenoids of one said group; a second said circuit including a plurality of leads insulated from said selector and extending therefrom, each respectively to one of the solenoids of the second said group, both said circuits including a joint return lead through said additional solenoid to said current source; said signal means including lights, respectively each mounted on one of said actuators, a circuit energized by said power source carrying all of said lights, said circuit including a pair of separable contacts, a solenoid, carrying means for separating said contacts on energization of said solenoid, means latching said contacts in open position, open leads, in said actuator, in circuit with said solenoid, said leads including contacts separable by energization of said solenoid; means for releasing said solenoid latching means, including an electric magnet, leads from said power source to said magnet including normally separated contacts, one of which contacts is carried by said action delaying arm and movable therewith into closure contact with the other thereof; said actuators each respectively including means manually operable to shift said selector into electrical contact with desired leads of said second group, and manually operable means for closing all said circuits leading therefrom, including said contacts to said contact separating solenoid.

4. In apparatus of the character described, a tabulating mechanism having depressible keys in banks, and electrically actuated printing and clearing mechanisms, including a depressible key for initiating actuation thereof; two groups of solenoids respectively disposed in operative relation above keys of adjacent said banks, an additional solenoid overlying said actuating mechanism key; and control and energizing means including a source of electric current; actuators positioned respectively at each of a plurality of stations, and including a first circuit having leads extending in parallel therefrom each respectively to a solenoid of one said group; a second said circuit including a plurality of leads extending from said selector respectively to all the solenoids of the second said group, both said circuits including a joint return lead through said additional solenoid to said current sources; said actuators each respectively including a selector comprising a current transmitting dial having a plurality of number identified notches peripherally therearound, a notch engaging detent, a circuit lead through said detent to said dial, a disc of insulating material underlying said dial and fingers, corresponding in number to the leads of said second circuit, and respectively each connected to a said lead, said fingers underlying and being biased toward contact with said insulating disc and dial, said disc having openings therethrough respectively corresponding with numbered notches on said dial through which finger contact with said dial is established, means manually operable to position said dial to establish desired said contacts, and manually operable means for closing all said circuits.

FRANK L. FOLIS.